US009286469B2

(12) United States Patent
Kraemer et al.

(10) Patent No.: US 9,286,469 B2
(45) Date of Patent: Mar. 15, 2016

(54) METHODS AND APPARATUS PROVIDING COMPUTER AND NETWORK SECURITY UTILIZING PROBABILISTIC SIGNATURE GENERATION

(75) Inventors: Jeffrey A. Kraemer, Wellesley, MA (US); Andrew Zawadowskiy, Nashua, NH (US)

(73) Assignee: Cisco Technology, Inc., San Jose, CA (US)

( * ) Notice: Subject to any disclaimer, the term of this patent is extended or adjusted under 35 U.S.C. 154(b) by 1995 days.

(21) Appl. No.: 11/499,460

(22) Filed: Aug. 4, 2006

(65) Prior Publication Data

US 2007/0256127 A1    Nov. 1, 2007

Related U.S. Application Data

(60) Provisional application No. 60/751,439, filed on Dec. 16, 2005.

(51) Int. Cl.
| | | |
|---|---|---|
| *G06F 21/52* | (2013.01) | |
| *G06F 21/55* | (2013.01) | |
| *G06F 21/56* | (2013.01) | |

(52) U.S. Cl.
CPC .............. *G06F 21/52* (2013.01); *G06F 21/55* (2013.01); *G06F 21/56* (2013.01); *G06F 21/566* (2013.01)

(58) Field of Classification Search
None
See application file for complete search history.

(56) References Cited

U.S. PATENT DOCUMENTS

| | | | |
|---|---|---|---|
| 5,696,822 A | 12/1997 | Nachenberg | |
| 5,870,723 A | 2/1999 | Pare, Jr. et al. | |
| 6,088,804 A | 7/2000 | Hill et al. | |
| 6,775,780 B1 * | 8/2004 | Muttik | 726/24 |
| 6,898,715 B1 | 5/2005 | Smithson et al. | |
| 6,990,591 B1 | 1/2006 | Pearson | |
| 7,007,302 B1 | 2/2006 | Jagger et al. | |
| 7,020,701 B1 | 3/2006 | Gelvin et al. | |

(Continued)

FOREIGN PATENT DOCUMENTS

| | | |
|---|---|---|
| EP | 1 418 484 A2 | 3/2003 |
| WO | WO 02/14989 A2 | 2/2002 |

(Continued)

OTHER PUBLICATIONS

Newsome, James et al. "Dynamic Taint for Automatic Detection, Analysis, and Signature Generation of Exploits on Commodity Software". Reprot CMU-CS- 4-140, Carnegie Mellon University, Published Jul. 2005. Retrieved form the Internet: <URL: http://reports-archive.adm.cs.cmu.edu/anon/2004/CMU-CS-04-140.pdf>.

(Continued)

*Primary Examiner* — Benjamin Lanier
(74) *Attorney, Agent, or Firm* — Hickman Palermo Becker Bingham LLP

(57) ABSTRACT

A system receives information from at least one security interceptor associated with at least one computer system. The information identifies details associated with a traffic flow in a computer system of the computer networking environment. The system determines a probability that an attack on the computer system is in progress based on a probabilistic link provided by the information. The probabilistic link is determined by attack information associated with previous attacks. Based on the information provided by the at least one security interceptor, the system generates a signature utilized to prevent a similar attack on the computer system.

24 Claims, 8 Drawing Sheets

(56) References Cited

U.S. PATENT DOCUMENTS

| | | | |
|---|---|---|---|
| 7,069,583 B2 | 6/2006 | Yann et al. | |
| 7,237,267 B2 | 6/2007 | Rayes et al. | |
| 7,263,718 B2 | 8/2007 | O'Brien et al. | |
| 7,343,624 B1* | 3/2008 | Rihn et al. | 726/24 |
| 7,363,515 B2 | 4/2008 | Frazier et al. | |
| 7,380,267 B2 | 5/2008 | Arai et al. | |
| 7,401,360 B2 | 7/2008 | Ravishankar et al. | |
| 7,448,084 B1 | 11/2008 | Apap et al. | |
| 7,516,478 B2 | 4/2009 | Limont et al. | |
| 7,546,629 B2 | 6/2009 | Albert et al. | |
| 7,555,776 B1 | 6/2009 | Lymer et al. | |
| 7,555,777 B2* | 6/2009 | Swimmer et al. | 726/23 |
| 7,565,426 B2 | 7/2009 | Jones et al. | |
| 7,715,315 B1 | 5/2010 | Ferguson et al. | |
| 7,716,716 B1 | 5/2010 | Boystun | |
| 7,739,685 B2 | 6/2010 | Vaddagiri | |
| 7,872,975 B2 | 1/2011 | Kruse et al. | |
| 7,882,560 B2 | 2/2011 | Kraemer et al. | |
| 7,917,393 B2 | 3/2011 | Valdes et al. | |
| 7,965,717 B2 | 6/2011 | Mistry et al. | |
| 7,979,889 B2 | 7/2011 | Gladstone et al. | |
| 8,001,610 B1 | 8/2011 | Chickering et al. | |
| 8,004,980 B2 | 8/2011 | Ferguson et al. | |
| 8,065,712 B1 | 11/2011 | Cheng et al. | |
| 8,613,096 B2 | 12/2013 | Peinado et al. | |
| 2002/0032871 A1* | 3/2002 | Malan et al. | 713/201 |
| 2002/0078049 A1 | 6/2002 | Samar | |
| 2002/0078368 A1 | 6/2002 | Yann et al. | |
| 2002/0078381 A1 | 6/2002 | Farley et al. | |
| 2002/0166063 A1* | 11/2002 | Lachman et al. | 713/200 |
| 2003/0027551 A1 | 2/2003 | Rockwell | |
| 2003/0084319 A1 | 5/2003 | Tarquini et al. | |
| 2004/0015719 A1 | 1/2004 | Lee et al. | |
| 2004/0054917 A1* | 3/2004 | Obrecht et al. | 713/200 |
| 2004/0064737 A1 | 4/2004 | Milliken et al. | |
| 2004/0073617 A1 | 4/2004 | Milliken et al. | |
| 2004/0103296 A1* | 5/2004 | Harp et al. | 713/200 |
| 2004/0111632 A1* | 6/2004 | Halperin | 713/200 |
| 2004/0117624 A1 | 6/2004 | Brandt et al. | |
| 2004/0172557 A1* | 9/2004 | Nakae et al. | 713/201 |
| 2004/0205474 A1* | 10/2004 | Eskin et al. | 715/500 |
| 2004/0250124 A1 | 12/2004 | Chesla et al. | |
| 2005/0076227 A1 | 4/2005 | Kang et al. | |
| 2005/0166268 A1 | 7/2005 | Szor | |
| 2005/0193430 A1* | 9/2005 | Cohen et al. | 726/25 |
| 2005/0283837 A1* | 12/2005 | Olivier et al. | 726/24 |
| 2006/0021035 A1 | 1/2006 | Conti et al. | |
| 2006/0026669 A1 | 2/2006 | Zakas | |
| 2006/0048228 A1 | 3/2006 | Takemori et al. | |
| 2006/0064755 A1 | 3/2006 | Azadet et al. | |
| 2006/0070128 A1 | 3/2006 | Heimerdinger et al. | |
| 2006/0123482 A1 | 6/2006 | Aaron | |
| 2006/0184682 A1 | 8/2006 | Suchowski et al. | |
| 2006/0191006 A1 | 8/2006 | Satake et al. | |
| 2006/0230124 A1 | 10/2006 | Belfiore et al. | |
| 2006/0230453 A1 | 10/2006 | Flynn et al. | |
| 2006/0236408 A1 | 10/2006 | Yan | |
| 2006/0259967 A1* | 11/2006 | Thomas et al. | 726/22 |
| 2007/0044152 A1 | 2/2007 | Newman et al. | |
| 2007/0136603 A1 | 6/2007 | Kuecuekyan | |
| 2007/0143824 A1 | 6/2007 | Shahbazi | |
| 2010/0082513 A1 | 4/2010 | Liu | |
| 2010/0242111 A1 | 9/2010 | Kraemer et al. | |
| 2013/0312104 A1 | 11/2013 | Kraemer | |
| 2014/0351942 A1 | 11/2014 | Kraemer et al. | |

FOREIGN PATENT DOCUMENTS

| | | |
|---|---|---|
| WO | WO 02/103498 A2 | 12/2002 |
| WO | WO 03/058451 A1 | 7/2003 |

OTHER PUBLICATIONS

Patent Cooperation Treaty (PCT) International Preliminary Reprot on Patentability from co-pending PCT International Patent Appliation No. PCT/US2007/015065, International Filing Date of Jun. 28, 2007, Priority Date Aug. 4, 2006, and entitled "Methods and Appartus Providing Computer and Network Security Utilizing Probabilistic Signature Generation"; having a date of mailing of Feb. 19, 2009.

European Patent Office, Search Report, for foreign patent application No. 06717493.8-2212/1834439 PCT/US2006000302 dated Jun. 29, 2011, 7 pages.

Current Claims in application No. 06717493.8-2212/1834439, 5 pages.

European Patent Office, Office Action, for foreign patent application No. 07776475.1-1245 dated Jun. 14, 2011, 5 pages.

Current claims in European patent application No. 07776475.1-1245, 4 pages, dated Jun. 2011.

Cohen I. et al., "Self Aware Services: Using Bayesian Networks for Detecting Anormalies in Internet-based Services", dated Dec. 31, 2001, 16 pages.

European Patent Office, Search Report, for foreign patent application No. 07756155.3-2212/20133728, dated May 3, 2011, 9 pages.

Current Claims for Application No. 07756155.3-2212/20133728, dated May 2011, 5 pages.

U.S. Appl. No. 11/414,909, filed May 1, 2006, Office Action, Oct. 10, 2012.

European Patent Office, EP International Search Report received in International Application No. 07835909.8 dated Mar. 1, 2012 (11 pages).

Current Claims, Application No. 07835909.8 (4 pages).

U.S. Appl. No. 12/789, 330, filed May 27, 2010, Final Office Action, Feb. 29, 2012.

U.S. Appl. No. 11/414,910, filed May 1, 2006, Notice of Allowance, Jan. 3, 2013.

Yin et al., "Panorama: Capturing System-wide Information Flow for Malware Detection and Analysis", 14th ACM conference, dated 2007, 13 pages.

* cited by examiner

208 RECEIVE INFORMATION FROM AT LEAST ONE SECURITY INTERCEPTOR ASSOCIATED WITH AT LEAST ONE COMPUTER SYSTEM, THE INFORMATION IDENTIFYING DETAILS ASSOCIATED WITH A TRAFFIC FLOW IN A COMPUTER SYSTEM OF THE COMPUTER NETWORKING ENVIRONMENT

209 RECEIVE NOTIFICATION THAT AT LEAST ONE EVENT HAS OCCURRED ON THE COMPUTER SYSTEM

210 RECEIVE INFORMATION ASSOCIATED WITH THE AT LEAST ONE EVENT THAT OCCURRED ON THE COMPUTER SYSTEM

211 MAP THE INFORMATION ASSOCIATED WITH THE AT LEAST ONE EVENT TO AT LEAST ONE DATA ENTRY POINT ON THE COMPUTER SYSTEM

212 IDENTIFY THAT THE AT LEAST ONE EVENT IS SPECIFIC TO THAT AT LEAST ONE DATA ENTRY POINT ON THE COMPUTER SYSTEM

FIG. 5

213 RECEIVE INFORMATION FROM AT LEAST ONE SECURITY INTERCEPTOR ASSOCIATED WITH AT LEAST ONE COMPUTER SYSTEM, THE INFORMATION IDENTIFYING DETAILS ASSOCIATED WITH A TRAFFIC FLOW IN A COMPUTER SYSTEM OF THE COMPUTER NETWORKING ENVIRONMENTM

214 DETECT THE AT LEAST ONE EVENT IS ASSOCIATED WITH A SET OF EVENTS, THE AT LEAST ONE EVENT OCCURRING GENERALLY AT A SAME TIME AS THE SET OF EVENTS

215 IDENTIFY THE AT LEAST ONE EVENT IS RELATED TO THE SET OF EVENTS, THE AT LEAST ONE EVENT HAVING A LINK TO THE SET OF EVENTS.

OR

216 IDENTIFY THE AT LEAST ONE EVENT IS NOT RELATED TO THE SET OF EVENTS DESPITE HAVING OCCURRED GENERALLY AT A SAME TIME AS THE SET OF EVENTS

OR

217 OBSERVE AN ORDER OF THE SET OF EVENTS, THE ORDER INCLUDING A PLACEMENT OF THE AT LEAST ONE EVENT WITHIN THE ORDER OF THE SET OF EVENTS

FIG. 6

218 DETERMINE A PROBABILITY THAT AN ATTACK ON THE COMPUTER SYSTEM IS IN PROGRESS BASED ON A PROBABILISTIC LINK PROVIDED BY THE INFORMATION, THE PROBABILISTIC LINK DETERMINED BY ATTACK INFORMATION ASSOCIATED WITH PREVIOUS ATTACKS

219 ASSOCIATE THE PROBABILITY TO A CONFIGURABLE LIMIT, THE CONFIGURABLE LIMIT DEFINING A THRESHOLD BEYOND WHICH AN ATTACK IS ASSUMED TO BE IN PROGRESS

↓

220 INITIALIZE THE CONFIGURABLE LIMIT OF THE PROBABILITY OF AN ATTACK

↓

221 DEFINE THE CONFIGURABLE LIMIT OF THE PROBABILITY OF AN ATTACK AS A RANGE OF CONFIGURABLE LIMITS

OR

222 MODIFY THE PROBABILITY OF AN ATTACK ON THE COMPUTER SYSTEM BASED ON THE INFORMATION PROVIDED BY THE AT LEAST ONE AGENT

FIG. 7

METHODS AND APPARATUS PROVIDING COMPUTER AND NETWORK SECURITY UTILIZING PROBABILISTIC SIGNATURE GENERATION

CROSS REFERENCE TO RELATED APPLICATIONS

The present application claims the benefit of U.S. Provisional Patent Application No. 60/751,439 filed on Dec. 16, 2005 and is related to U.S. Utility patent application Ser. No. 11/414,909 filed on May 1, 2006, U.S. Utility patent application Ser. No. 11/415,022 filed on May 1, 2006, U.S. Utility patent application Ser. No. 11/414,810 filed on May 1, 2006 and U.S. Utility patent application Ser. No. 11/414,910 filed on May 1, 2006, the contents and teachings of which are hereby incorporated by reference in their entirety.

BACKGROUND

Computer systems (i.e., CPU, memory and related electronics), networks (i.e., a system of computers interconnected by telephone wires or other means in order to share information) and data centers (i.e., a facility housing a large amount of electronic equipment) are exposed to a constant and differing variety of attacks that expose vulnerabilities of such systems in order to compromise their security and/or operation. As an example, various forms of malicious software program attacks include viruses, worms, Trojan horses and the like that computer systems can obtain over a network such as the Internet. Quite often, users of such computer systems are not even aware that such malicious programs have been obtained within the computer system. Once resident within a computer system, a malicious program that executes might disrupt operation of the computer system to a point of inoperability and/or might spread itself to other computer systems within a computer networking environment or data center by exploiting vulnerabilities of the computer system's operating system or resident application programs. Other malicious programs might operate within a computer system to secretly extract and transmit information within the computer system to remote computer systems for various suspect purposes. As an example, spyware is a form of software that can execute in the background (e.g., unbeknownst to users) of a computer system and can perform undesirable processing operations such as tracking, recording and transmitting user input from the spyware-resident computer system to a remote computer system. Spyware can allow remote computer systems to silently obtain otherwise confidential information such as usernames and passwords required to access protected data, lists, contents of files or even remote web sites user account information.

Computer system developers, software developers and security experts have created many types of conventional preventive measures that operate within conventional computer systems in an attempt to prevent operation of malicious programs from stealing information or from compromising proper operation of the computer systems. As an example, conventional virus detection software operates to periodically download a set of virus definitions from a remotely located server. Once the virus detection software obtains the definitions, the virus detection software can monitor incoming data received by the computer system, such as email messages containing attachments, to identify viruses defined within the virus definitions that might be present within the data accessed by the computer. Such data might be obtained over a network or might be unknowingly resident on a computer readable medium, such as a disk or CD-ROM that a user inserts into the computer. Upon detection of inbound data containing a virus or other malicious program, the virus detection software can quarantine the inbound data so that a user of the computer system will not execute code or access the data containing the detected virus that might result in compromising the computer's operation.

Other examples of conventional malicious attacks, intrusions, or undesirable processing that can cause problems within computer systems or even entire networks include virus attacks, worm attacks, trojan horse attacks, denial-of-service attacks, buffer overflow operations, execution of malformed application data, and execution of malicious mobile code. Virus attacks, worm attacks, and trojan horse attacks are variants of each other that generally involve the execution of a program, for which a user often is unaware of its existence, that performs some undesired processing operations to comprise a computer's proper operation. A denial-of-service attack operates to provide an intentional simultaneous barrage of packets (e.g., many connection attempts) emanating from many different computer systems to one or more target computer systems, such as a web site, in order to intentionally cause an overload in processing capabilities of the target computer system resulting in disruption of service or a business function provided by the target computer. Denial of Service attacks may also seek to crash the targeted computer system (rather than simply consume resources). Buffer overflow attacks occur when programs do not provide appropriate checks of data stored in internal data structures within the software that result in overwriting surrounding areas of memory. Attacks based on buffer overflows might allow an attacker to execute arbitrary code on the target system to invoke privileged access, destroy data, or perform other undesirable functions. Malformed application data attacks might result in an application containing a code section that, if executed, provides access to resources that would otherwise be private to the application. Such attacks can expose vulnerabilities due to an incorrect implementation of the application, for example by failing to provide appropriate data validity checks, or allowing data stream parsing errors, and the like.

Many of the conventional malicious programs and mechanisms for attack of computer systems, such as viruses and worms, include the ability to redistribute themselves to other computer systems or devices within a computer network, such that several computer systems become infected and experience the malicious processing activities discussed above. Some conventional attempts to prevent redistribution of malicious programs include implementing malicious program detection mechanisms such as virus detection software within firewalls (i.e., software that prevents unauthorized users from gaining access to a network) or gateways (i.e., software or hardware that enables communication between networks that use different communications protocols) between different portions of networked computer systems in order to halt propagation of malicious programs to sub-networks.

SUMMARY

Conventional technologies for providing computer security suffer from a variety of deficiencies. In particular, conventional technologies for providing computer security are limited in that conventional security software programs rely on the ability to periodically remotely receive information such as virus definitions that allow the conventional security software programs to identify and quarantine malicious programs. Many of the most common conventional forms of security software such as virus definitions programs rely upon obtaining the periodic virus definition updates from a centralized server accessed over the Internet that is maintained by the vendor of the security software. As a result, the most recent virus definition updates only reflects those viruses that have been recently detected. Those viruses are fingerprinted and inserted into the virus definition file by the vendor of the virus definition. The vendor of the virus definition maintains and distributes the virus definition files.

Because conventional security software programs require periodic updates, such conventional security software programs are only as good as the most recent updates of the malicious program definitions (e.g., virus definitions) that individual instances of the conventional protection software have been able to receive. As an example, conventional virus detection software will not recognize viruses created and transmitted to a computer system that have not yet been identified and/or defined within the most recent update of a set of virus definitions obtained from a remote server. Accordingly, the malicious program code or data not defined within the most recent virus definitions update may be successfully inserted and executed within computer systems in a computer networking environment in order to perform some of the malicious processing discussed above, even though such systems are equipped with conventional security software (i.e., virus detection software).

As a result, conventional security software program implementations are often several steps behind the prevention and spread of new attacks that are constantly being created and disseminated by malicious program developers. This problem is compounded by the fact that modern malicious programs are able to distribute themselves quickly to hundreds or thousands of computer systems within a computer networking environment, such as the Internet within a short amount of time, such as several hours, whereas most conventional security software only obtains updates on a less frequent basis, such as nightly. Additionally, modern malicious programs can modify themselves to appear to be a new attack (called a "Day Zero" attack because this is the first time the attack appears on the network) each time the malicious program runs. These malicious programs are known as polymorphic attacks for their ability to appear to be a "Day Zero" attack each time they execute.

Embodiments disclosed herein significantly overcome such deficiencies and provide a computer system that includes a probabilistic signature generation process. The probabilistic signature generation process rapidly identifies malicious attacks and prevents the spread of such attacks to other computer systems. In effect, embodiments disclosed herein provide for a self-healing computer system. Embodiments disclosed herein include one or more security agents that operate within individual computer systems in a computer networking environment. The security agents can interact with a management center to obtain a security policy that contains a set of rules that indicate types of operations that may be allowed or disallowed within the computer system. Once a security agent has obtained the security policy, the security agent operates a plurality of security interceptors that can watch over, and monitor processing operations performed by various software and hardware components within the computer system that the security agent protects. The security agent provides security to a computer system by detecting processing outcomes produced via operation of a sequence of related processing operations within the computer system. As an example, processing operations related to an inbound connection to a Web server can be monitored by various security interceptors operating within different parts of the computer system's operating system and application layer code in order to detect the related sequence of processing operations that the inbound Web server connection attempt triggers. Each security interceptor detects a specific event and transfers that event to an event correlation engine that records the processing outcomes and the sequence of related processing operations in a security history. The event correlation engine identifies a security violation when one of the detected processing operations in the security history produces a processing outcome that violates a security policy. This may be before, during or after occurrence of an undesired processing outcome within computer system such as a system crash, system error, protection violation, process disruption or other such undesired action as defined within the security policy. The security agent is then able to subsequently detect attempted performance of a similar sequence of related processing operations that attempt to produce at least one processing outcome that violates the security policy. In response, the security agent denies operation of at least a portion of the sequence of related processing operations within the computerized device to avoid violation of the security policy. The security agents can also mark or otherwise identify sequences of processing operations that led up to the security violation as a disallowed sequence of processing operations and can disseminate this information to other security agents operating on other computer systems in the network in real-time (e.g., upon detection) in order to spread the knowledge of the behavior or processing pattern that the malicious attack attempted to perform on the computer system that detected the attack, so that other computer systems will not be vulnerable to the attack.

Embodiments disclosed herein include a computer system executing a probabilistic signature generation process. In one embodiment, the probabilistic signature generation process inserts security interceptors into the computer system. Events and policy violations are observed, and used to determine a probability of whether or not an attack is occurring. Observed events (including policy violations) can be taken in sequence or as a set, to yield different probabilities of an attempted attack. When the probability of an attack being executed crosses a specified threshold, the probabilistic signature generation process probabilistically links the observed events to the probability that an attack is occurring, and attempts to identify a root cause. This may be accomplished by examining one or more histories of received data (possibly tied to applications casually related to a policy violation) collected over one or more repeated attacks. Common elements from the histories can be used to identify the source data for the attack. A signature can then be generated from this data, and applied as a filter at the appropriate data interface to prevent subsequent attacks.

The probabilistic signature generation process receives information from at least one security interceptor. The information identifies details associated with a traffic flow in a computer system. The probabilistic signature generation process determines a probability that an attack on the computer system is in progress based on a probabilistic link provided by the information. The probabilistic link is determined by attack information associated with previous attacks. Based on the information provided by the at least one security interceptor, the probabilistic signature generation process generates a signature utilized to prevent a similar attack on the computer system.

During an example operation of one embodiment, suppose the probabilistic signature generation process is monitoring a computer system. In one embodiment, the probabilistic signature generation process inserts security interceptors in the computer system, and receives information (such as a buffer overflow, etc.) from the security interceptors. Based on the information that a buffer overflow has occurred and the fact that previous attacks on other computer systems had caused buffer overflows, the probabilistic signature generation process determines a probability that an attack is in process on the computer system. The probabilistic signature generation process attempts to generate a signature based on the information (i.e., the buffer overflow) provided by the security interceptors. The signature is used to prevent a similar attack on the computer system (or any other computer system on which the probabilistic signature generation process is monitoring).

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer system or a data communications device or any type of processor that is programmed or configured to operate as explained herein is considered an embodiment disclosed herein.

Other embodiments that are disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein as embodiments disclosed herein.

It is to be understood that the system disclosed herein may be embodied strictly as a software program, as software and hardware, or as hardware alone. The features, as explained herein, may be employed in data communications devices and other computerized devices and software systems for such devices such as those manufactured by Cisco Systems, Inc. of San Jose, Calif.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

FIG. 5 illustrates a flowchart of a procedure performed by a computer system of FIG. 1 when the probabilistic signature generation process receives information from at least one security interceptor, the information identifying details associated with a traffic flow on the computer system, according to one embodiment disclosed herein.

FIG. 6 illustrates a flowchart of a procedure performed by a computer system of FIG. 1 when the probabilistic signature generation process receives information associated with at least one event that occurred on the computer system, according to one embodiment disclosed herein.

FIG. 7 illustrates a flowchart of a procedure performed by a computer system of FIG. 1 when the probabilistic signature generation process determines a probability that an attack on the computer system is in progress based on a probabilistic link provided by the information, according to one embodiment disclosed herein.

DETAILED DESCRIPTION

Embodiments disclosed herein include a computer system executing a probabilistic signature generation process. In one embodiment, the probabilistic signature generation process inserts security interceptors into the computer system. Events and policy violations are observed, and used to determine a probability of whether or not an attack is occurring. Observed events and policy violations can be taken in sequence or as a set, to yield different probabilities of an attempted attack. When the probability of an attack being executed crosses a specified threshold, the probabilistic signature generation process probabilistically links the observed events to the probability that an attack is occurring, and attempts to identify a root cause. This may be accomplished by examining one or more histories of received data (possibly tied to applications casually related to a policy violation) collected over one or more repeated attacks. Common elements from the histories can be used to identify the source data for the attack. A signature can then be generated from this source data, and applied as a filter at the appropriate data interface to prevent subsequent attacks.

The probabilistic signature generation process receives information from at least one security interceptor. The information identifies details associated with a traffic flow in a computer system of the computer networking environment. The probabilistic signature generation process determines a probability that an attack on the computer system is in progress based on a probabilistic link provided by the information. The probabilistic link is determined by attack information associated with previous attacks. Based on the information provided by the at least one security interceptor, the probabilistic signature generation process generates a signature utilized to prevent a similar attack on the computer system.

Figure 1:
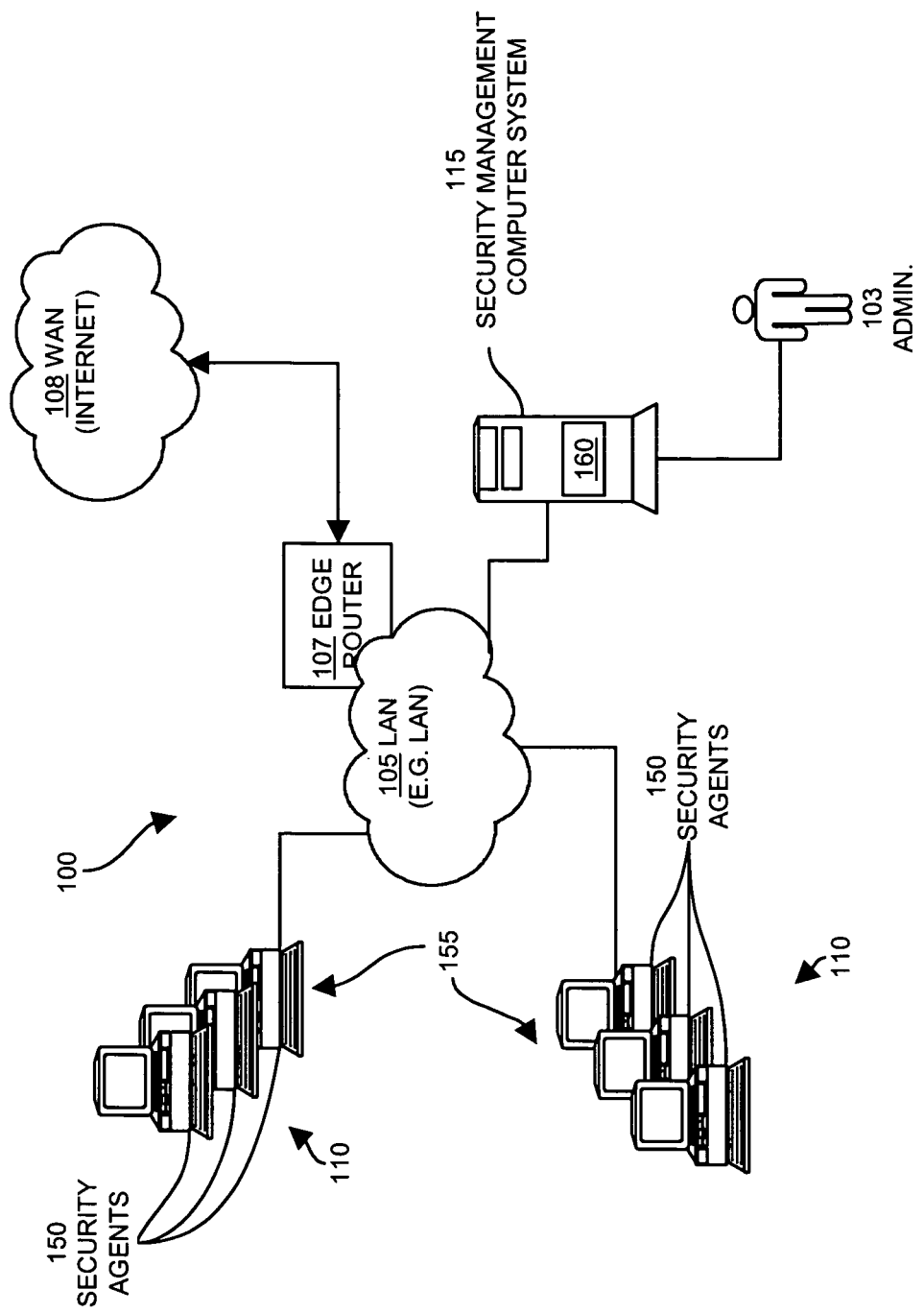
FIG. 1 illustrates an example configuration of a computer networking environment that includes a security system configured as disclosed herein.

FIG. 1 illustrates an example computer networking environment 100 suitable for use in explaining example embodiments disclosed herein. The computer networking environment 100 includes a computer network 105 such as a local area network (LAN) that interconnects a security management computer system 115, an edge router 107 and a plurality of computer systems 110, each of which executes (e.g., runs, interprets, etc.) a security agent process 150 configured as disclosed herein. Each security agent process 150 is running an instance of the probabilistic signature generation process 155. The security management computer system 115 also executes a management center application 160 that operates as disclosed herein. The edge router 107 couples the network 105 to a wide area network (WAN) 108 such as the Internet that allows communication between the computer systems 110, 115 and other computers worldwide. Note that the management center computer 115 may be isolated form the WAN 108 by a firewall or gateway that is not shown in this example.

The computer systems 110 may be any type of computer system, workstation, server (e.g., web server), personal computer, network device, laptop, mainframe, personal digital assistant device, general purpose or dedicated computing device or the like that operate any type of software, firmware or operating system. They may be physically or wirelessly coupled to the network 105 to support communications. The security agent processes 150 and management center application 160 dynamically detect and prevent malicious attacks on the computer systems 110 without requiring the security agent processes 150 to continuously and periodically download signature or virus definition files. Generally, an administrator 103 installs the security agent processes 150 (including the probabilistic signature generation process 155) on the computer systems 110 that are to be protected and the security agent processes 150 are responsible for enforcing the appropriate security policies on those systems. An example of a security policy may be, "when an attack on the computer system is detected, and the result of the graphical model indicates the probability of an attack exceeds seventy percent, deny all new network connections". The security agent processes 150 (including the probabilistic signature generation process 155) have the ability to learn what causes security violations, such as malicious attacks, by monitoring, analyzing and recording processing behavior and events of the computer system 110 that occur prior to the security violation taking place. By learning what causes security violations, the security agent processes 150 strive to prevent such events from occurring in the future. In other words, the security system disclosed herein is able to monitor and record processing behavior that results in an undesired processing operation, such as a process exception, system crash or the like. The security system is able to analyze recorded processing operations that led up to undesired operation or problem to identify the root cause of the attack. Once identified, the security system is able to prevent that single processing operation or sequence of processing operations identified as the root cause of the attack from executing again on that or other computer systems in order to avoid further security violations and to prevent such attacks on other computer systems. A security agent process 150, as disclosed herein, can learn of new types of malicious attacks without having seen processing associated with previous attacks, and can prevent that attack in the future. The ability to learn of processing associated with a new attack, identify the root cause of the attack, and prevent the attack from happening in the future can occur with or without external input (e.g., virus definition files) being received by a computer system equipped with the security agent. In an example embodiment, external input may be used as input during a learning operation to identify new attacks.

A security agent process 150 can also be preprogrammed with software that will prevent one or more known security violations in a rule-based security policy and therefore can prevent such violations from happening. In addition, such processing also involves recording and post-processing security history event data that result in a security violation (i.e., that was not preprogrammed and thus unrecognizable a first time) to identify a root cause (e.g., one or more processing operations or events) of the security violation within the computer system in order to prevent it from happening a second time. This can involve performing a local comparison of several security histories collected by a security agent process 150 in a single computer system 110 to identify a common pattern of processing activity that results in an undesirable processing outcome (i.e., a security violation). The security agent processes 150 can also transmit event and security history information to the security management computer system 115.

The security management computer system 115 acts as a central repository for all event log records event and security history information generated by the security agent processes 150 and provides functions for monitoring and reporting. The security management computer system 115 also correlates event records generated from security agent processes 150 operating on different computer systems 110 for purposes of detecting suspicious activity in the network.

Figure 2:
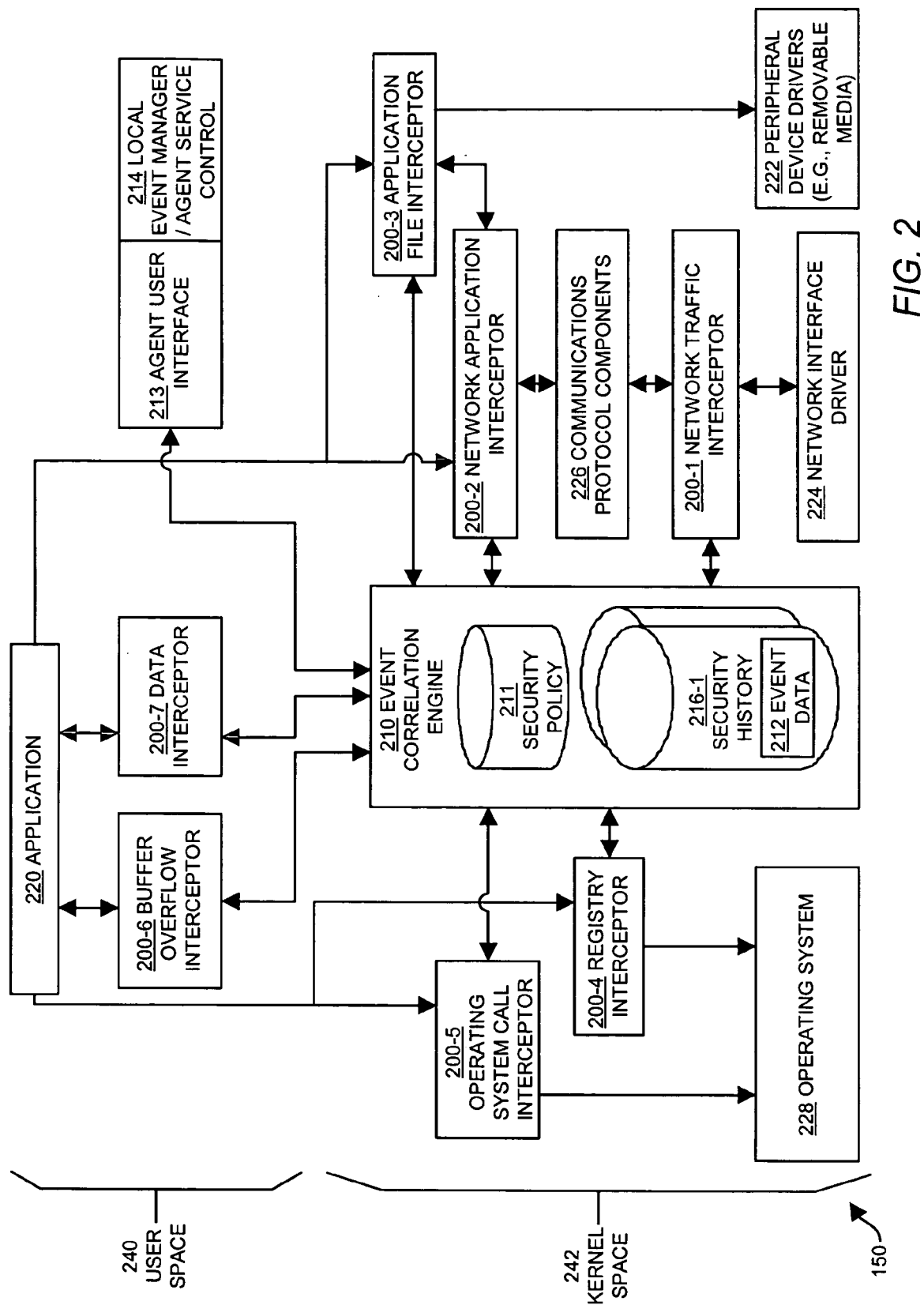
FIG. 2 illustrates example architecture of the computerized device configured with a security system in one example configuration.

FIG. 2 illustrates a particular embodiment of an architecture of a computer system 110 configured with a security agent process 150 in accordance with one example embodiment. The security agent process 150 includes a plurality of security interceptors 200-1 through 200-7 including, for example, a network traffic interceptor 200-1, the network application interceptor 200-2, an application file interceptor 200-3, a registry interceptor 200-4, an operating system call interceptor 200-5, a buffer overflow interceptor 200-6 and a data interceptor 200-7. The security agent process 150, in this example configuration, also includes an event correlation engine 210, a security interceptor user interface 213, and local event manager/security interceptor service control 214. The event correlation engine 210 stores a security policy 211 that contains rules that are used to instruct the security agent process 150 to protect the computer system 110 on which it operates. The computer system 110 is protected by the event correlation engine 210, by interpreting and enforcing the rules to restrict the operations that may be performed by that computer system 110. An administrator 103 uses the management center application 160 to create and distribute security policies to each computer system 110 to be protected.

In one configuration, the network traffic interceptor 200-1 resides between a communications protocol component 226 (such as a TCP driver), and the network interface card 224 or other communications interface. The network traffic interceptor 200-1 inspects packets coming from the network before they get to the native operating system TCP stack, and can detect malicious operations or instructions, such as a remote computer scanning the computer system 110. Such attacks can include, for example, a ping of death attack, a TCP SYN flood attack, port scanning attacks and so forth. Other security interceptors 200-N can include packet interceptors, connection interceptors, file sharing interceptors, data filter interceptors, registry interceptors, system call interceptors, and the like. The security interceptors 200-N can be installed and executed by using, for example, windows registry keys that create dependencies on standard Operating Systems (OS)

dynamically linked libraries (dlls) so that the interceptor dlls are loaded along with the appropriate windows dlls that they monitor. The security interceptors 200-N can thus serve as wrappers to monitor processing operations of all calls made to any specific computer system components.

This example configuration also includes several components that operate within the computer system 110 and that are not part of the security agent architecture itself. In particular, this example configuration includes one or more software applications 220 that execute within a user space 240 within the computer system 110. The computer system 110 further operates several components in kernel space 242 such as one or more device peripheral device drivers 222, a network interface driver 224, communications protocol components 226, and an operating system 228. It is to be understood that the components 222, 224, 226, and 228 are illustrated as separate for purposes of description of operations disclosed herein, and that they may be combined together, such as an operating system that includes device drivers 222 and communication protocol components 226.

Generally, according to operations of embodiments disclosed herein, the security interceptors 200-N monitor processing activities and collect and report event data 212 to the event correlation engine 210 for the respective standard processing components 220, 222, 224, 226, and 228 within the user and kernel spaces 240 and 242. The event correlation engine 210 stores the event data within one or more security histories 216-1. Event data 212 can include things such as the identification of new connection requests made to the network interface driver 224, as detected by the network traffic interceptor 200-1. As another example, the network application interceptor 200-2 can identify a processing activity such as an application 220 accessing a particular file via an operating system call and report this as event data 212 to the event correlation engine 210. There may be other security interceptors 200-N besides those illustrated in FIG. 2, and thus the interceptors 200-1 through 200-6 are shown by way of example only. The event correlation engine 210 correlates the event data 212 against the security policy 211 in order to provide an indication to the security interceptors 200-N of whether or not the processing activity associated with the event data 212 should be allowed. The event correlation engine 210 can also instruct the security interceptors 200-N to collect more or less event data 212 as needed. By being able to track operations, in the event of an undesirable processing operation, the behavior of the computer system 110 can be analyzed and the series of events that took place that lead up the undesirable processing operation can be "fingerprinted" and marked so that if they occur again, they can be prevented prior to their full execution. In addition, by recording traces from multiple failures and determining a commonality between them, if several computer systems 110 suffer similar attacks, a commonality between the attacks can be identified, handled, and prevented in the future, even in situations where the attacking program morphs its identity or changes it content.

Further details of configurations explained herein will now be provided with respect to a flow chart of processing steps that show the high level operations disclosed herein. Unless otherwise stated, the steps described below are unordered meaning that, when possible, the steps can be performed in any convenient or desirable order.

Figure 3:
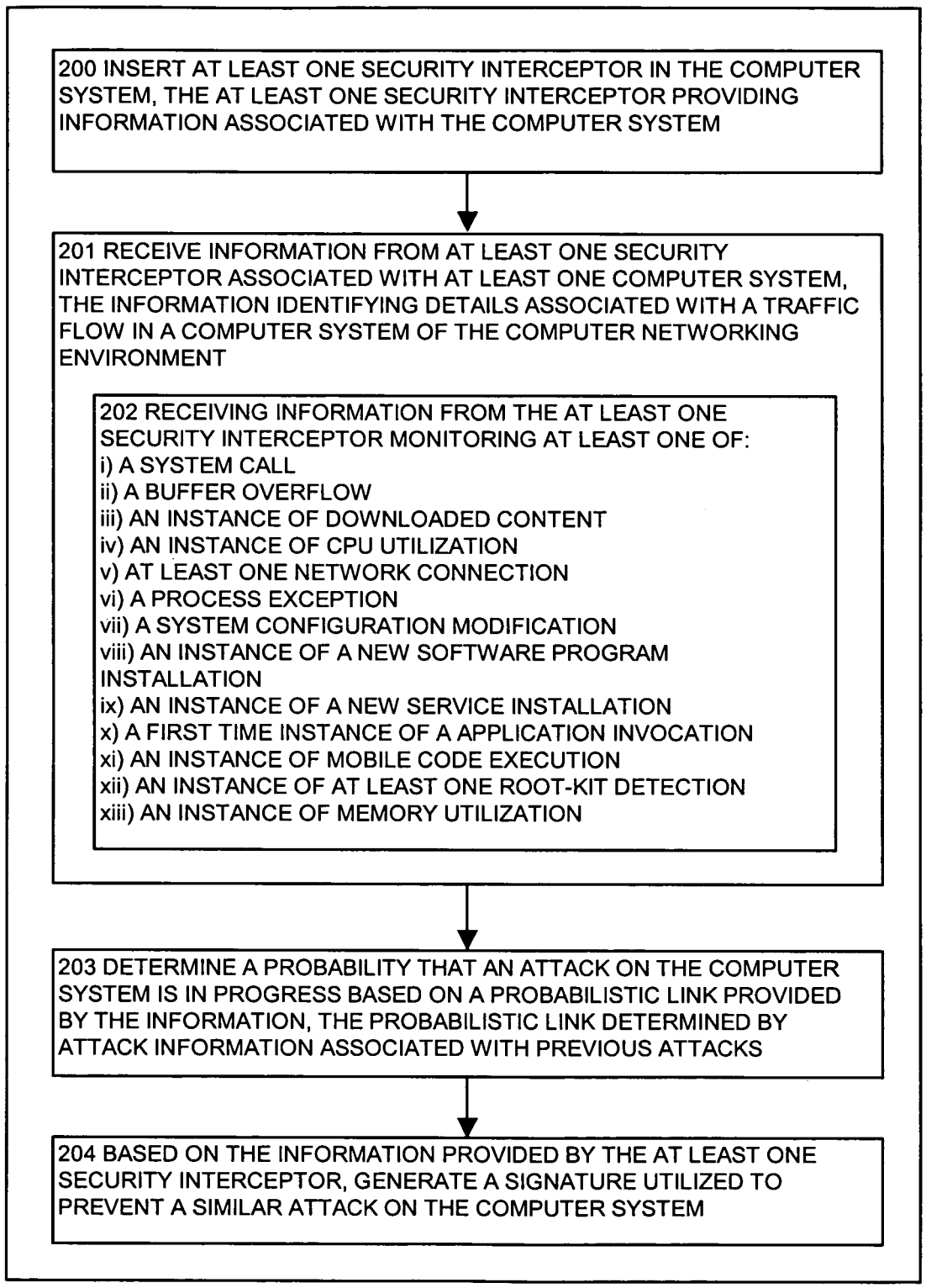
FIG. 3 illustrates a flowchart of a procedure performed by a computer system of FIG. 1 when the probabilistic signature generation process inserts at least one security interceptor in the computer system, the security interceptor providing information associated with the computer system, according to one embodiment disclosed herein.

FIG. 3 is a flowchart of the steps performed by the probabilistic signature generation process 155 when it inserts at least one security interceptor 200-N in the computer system. The security interceptor 200-N provides information associated with the computer system.

In step 200, the probabilistic signature generation process 155 inserts at least one security interceptor 200-N in the computer system. The security interceptor 200-N provides information associated with the computer system. In an example embodiment, the security interceptor 200-N is a 'hook' that is inserted into a function (that resides on the computer system) at an entry point in the function. The hook (i.e., security interceptor 200-N) provides information to the computer system, as well as providing information associated with the state of the computer system at the time of entry into that function during operation of the computer system.

In step 201, the probabilistic signature generation process 155 receives information from at least one security interceptor 200-N associated with at least one computer system. The information identifies details associated with a traffic flow in a computer system of the computer networking environment. In an example embodiment, the probabilistic signature generation process 155 inserts a hook (i.e., security interceptor 200-N) into a function, at an entry point in the function. When the function is called, and begins execution, the hook (i.e., security interceptor 200-N) provides information to the computer system. The information provides the probabilistic signature generation process 155 with information that the function has started executing. As traffic (i.e., both 'good' traffic, and potentially malicious traffic), travels through the computer system, the hook (i.e., security interceptor 200-N) provides information to the probabilistic signature generation process 155.

In step 202, the probabilistic signature generation process 155 receives information from the at least one security interceptor monitoring at least one of:
  i) a system call
  ii) a buffer overflow
  iii) an instance of downloaded content
  iv) an instance of CPU utilization
  v) at least one network connection
  vi) a process exception
  vii) a system configuration modification
  viii) an instance of a new software program installation
  ix) an instance of a new service installation
  x) a first time instance of a application invocation
  xi) an instance of mobile code execution
  xii) an instance of at least one root-kit detection
  xiii) an instance of memory utilization.
Other system resources can also be monitored.

In step 203, the probabilistic signature generation process 155 determines a probability that an attack on the computer system is in progress based on a probabilistic link provided by the information. The probabilistic link is determined by attack information associated with previous attacks on that computer system or other computer systems within, for example, the computer networking environment. The hooks (i.e., security interceptors 200-N) provide information to the probabilistic signature generation process 155. Based on the information received from the hooks (i.e., security interceptors 200-N), and the history associated with the information (that correlates the information with previous attacks), the probabilistic signature generation process 155 probabilistically links the information with the probability that an attack is occurring on the system.

Based on the information provided by the security interceptor 200-N, in step 204, the probabilistic signature generation process 155 generates a signature. The signature is utilized to prevent a similar attack on the computer system. The signature may be generated based on a bad packet (i.e., packet that executes an attack on a computer system) or based on a history of tracked resources. The signature may be propagated to other computer systems to protect those computer systems from the same attack.

Figure 4:
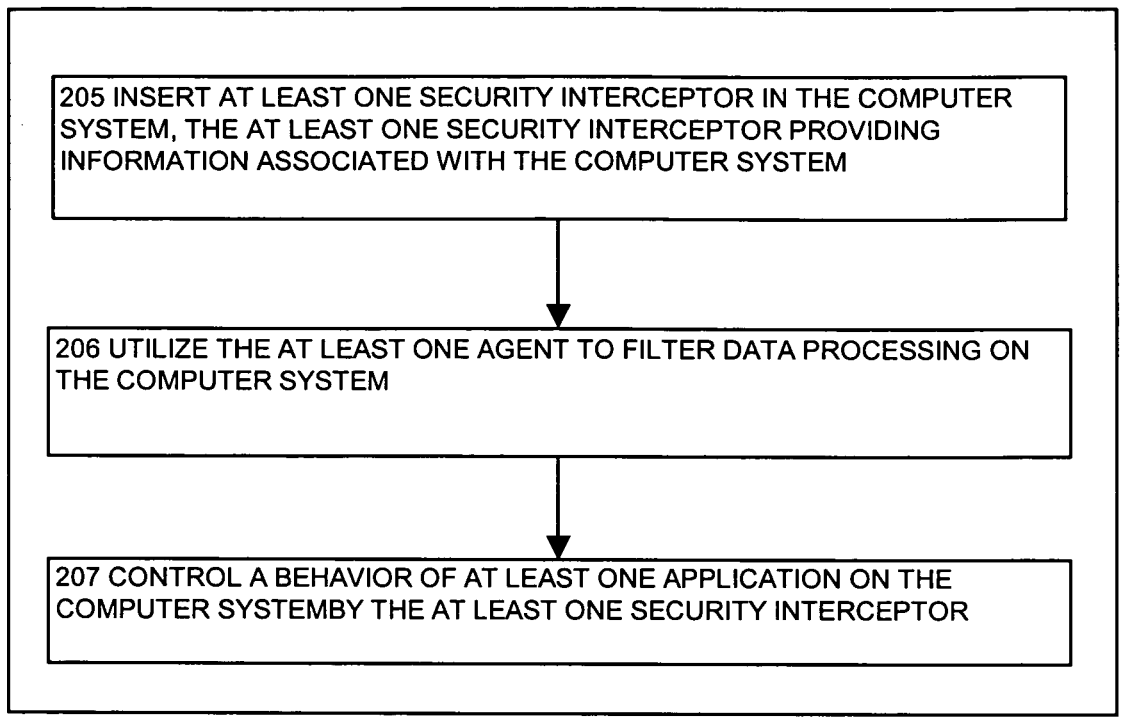
FIG. 4 illustrates a flowchart of a procedure performed by a computer system of FIG. 1 when the probabilistic signature generation process inserts at least one security interceptor in the computer system, and uses the security interceptor to monitor system behavior, according to one embodiment disclosed herein.

FIG. 4 is a flowchart of the steps performed by the probabilistic signature generation process 155 when it inserts at least one security interceptor 200-N in the computer system.

In step 205, the probabilistic signature generation process 155 inserts at least one security interceptor 200-N in the computer system. The security interceptor 200-N provides information associated with the computer system. In an example embodiment, the security interceptor 200-N is a 'hook' that is inserted into a function, at an entry point in the function. The hook (i.e., security interceptor 200-N) provides information to the computer system, as well as providing information associated with the state of the computer system at the time of entry into that function during operation of the computer system.

In step 206, the probabilistic signature generation process 155 utilizes the security interceptor 200-N to filter data processing on the computer system. In an example embodiment, the signature generating process 155 uses the security interceptors 200-N to filter data on, for example, public RPC interfaces, or URI filters.

In step 207, the probabilistic signature generation process 155 controls a behavior of at least one application on the computer system by the insertion of the security interceptor 200-N. In an example embodiment, the probabilistic signature generation process 155 modifies binary code of a well known exported function to redirect function calls into a security subroutine. The security sub routine performs a set of required security checks, and then executes the original function call code. This technique may be used to modify not only drivers, but also application or DLL entry points. Thus, the control points are used to monitor behavior, as well as control access.

FIG. 5 is a flowchart of the steps performed by the probabilistic signature generation process 155 when it receives information from the security interceptor 200-N.

In step 208, the probabilistic signature generation process 155 receives information from the security interceptor 200-N associated with at least one computer system. The information identifies details associated with a traffic flow on the computer system. In an example embodiment, the probabilistic signature generation process 155 inserts a hook (i.e., security interceptor 200-N) into a function, at an entry point in the function. When the function is called, and begins execution, the hook (i.e., security interceptor 200-N) provides information to the computer system. The information provides the probabilistic signature generation process 155 with information that the function has started executing. As traffic (i.e., both 'good' traffic, and potentially malicious traffic), travels through the computer system, the hook (i.e., security interceptor 200-N) provides information to the probabilistic signature generation process 155.

In step 209, the probabilistic signature generation process 155 receives notification that at least one event has occurred on the computer system. The security agent process 150, executing the probabilistic signature generation process 155, monitors events on the computer system. As events occur, the probabilistic signature generation process 155 identifies events that could be an indication of a security attack on the computer system. In an example configuration, the probabilistic signature generation process 155 receives notification that an event, such as an instance of a software application being installed on the computer system, has occurred.

In step 210, the probabilistic signature generation process 155 receives information associated with the event that occurred on the computer system. In an example configuration, the probabilistic signature generation process 155 receives notification that at least one event (that may or may not be related to an attack on the computer system) has occurred. The probabilistic signature generation process 155 then receives information, related to the event that occurred, from the "hooks" (i.e., security interceptors 200-N).

In step 211, the probabilistic signature generation process 155 maps the information associated with the event to at least one data entry point on the computer system. In an example configuration, a system or application triggers one of a class of policy violations, where a direct association can be mapped from the attack back to a "data entry" control point (i.e., Buffer Overflow, process exception, etc.). The data processed by the thread is identified as an exploit specific to this interface. The data and thread can be associated at the beginning of the data processing (and temporarily stored), or the data may actually be passed along to the point of the policy violation.

In step 212, the probabilistic signature generation process 155 identifies that the event is specific to that data entry point on the computer system. In an example configuration, the probabilistic signature generation process 155 maps the information associated with the attack to a data entry point on the computer system, and identifies that the attack is specific to the data entry point to which the attack was mapped.

FIG. 6 is a flowchart of the steps performed by the probabilistic signature generation process 155 when it receives information associated with the event that occurred on the computer system.

In step 213, the probabilistic signature generation process 155 receives information associated with the event that occurred on the computer system. In an example configuration, the probabilistic signature generation process 155 receives notification that at least one event (that may be related to an attack on the computer system) has occurred. The probabilistic signature generation process 155 then receives information, related to the event that occurred, from the "hooks" (i.e., security interceptors 200-N).

In step 214, the probabilistic signature generation process 155 detects the event is associated with a set of events. The event occurs generally at a same time as the set of events. In an example configuration, the probabilistic signature generation process 155 detects a single event. The probabilistic signature generation process 155 then determines the single event is associated with a set of events. The association of the single event with the set of events provides the probabilistic signature generation process 155 with additional information that may help in determining whether an attack is occurring on the computer system, and may also help the probabilistic signature generation process 155 determine the root cause of the attack (if any) on the computer system. In an example embodiment, the set of events is an ordered set of events. In another example embodiment, the set of events is an unordered set of events.

In step 215, the probabilistic signature generation process 155 identifies that the event is related to the set of events. The event has a link to the set of events. In an example configuration, the probabilistic signature generation process 155 detects a single event, and then determines the single event is associated with a set of events. For example, the probabilistic signature generation process 155 detects an unfamiliar system call (i.e., the single event), and a buffer overflow and process exceptions (i.e., a set of events). The probabilistic signature generation process 155 determines that the unfamiliar system call (i.e., the single event) is related to the buffer overflow and process exceptions (i.e., a set of events) in that the buffer overflow and process exceptions (i.e., a set of events) occurred after the unfamiliar system call (i.e., the single event) occurred. Thus, the probabilistic signature generation process 155 determines a cause and effect between the unfamiliar system call (i.e., the single event) and the buffer overflow and process exceptions (i.e., a set of events).

Alternatively, in step 216, the probabilistic signature generation process 155 identifies the at least one event is not related to the set of events, despite having occurred generally at a same time as the set of events. In an example configuration, the probabilistic signature generation process 155 detects a single event, and then determines the single event is not associated with a set of events. For example, the probabilistic signature generation process 155 detects high CPU utilization (i.e., the single event), and several network connections (i.e., a set of events). The probabilistic signature generation process 155 determines that high CPU utilization (i.e., the single event) is not related to the instance of several network connections (i.e., a set of events). Thus, the probabilistic signature generation process 155 determines that while high CPU utilization (i.e., the single event) and the instance of several network connections (i.e., a set of events) may potentially be separate instances of an attack on the computer system, they are not related to the (potentially) same attack on the computer system.

Alternatively, in step 217, the probabilistic signature generation process 155 observes an order of the set of events, the order including a placement of the event within the order of the set of events. In an example configuration, the probabilistic signature generation process 155 detects a set of events occurring. The probabilistic signature generation process 155 observes the order in which the events occurred to determine if the occurrence of those events indicates an attack on the computer system. For example, an instance of a first time invocation of a software application, followed by high CPU utilization, followed by several strange system calls could indicate a higher probability of an attack on the computer system. However, an instance of high CPU utilization followed by a first time invocation of a software application would indicate that the instance of high CPU utilization is an indication of a lower probability of an attack on the computer system.

FIG. 7 is a flowchart of the steps performed by the probabilistic signature generation process 155 when it determines a probability that an attack on the computer system is in progress based on a probabilistic link provided by the information.

In step 218, the probabilistic signature generation process 155 determines a probability that an attack on the computer system is in progress based on a probabilistic link provided by the information. The probabilistic link is determined by attack information associated with previous attacks. In an example embodiment, the probabilistic signature generation process 155 inserts hooks (i.e., security interceptors 200-N) into the computer system to monitor events. The hooks (i.e., security interceptors 200-N) provide information to the probabilistic signature generation process 155. Based on the information received, and whether that information was previously connected with attacks on the computer system (or another computer system), the probabilistic signature generation process 155 probabilistically links the information with the probability that an attack is occurring on the system.

In step 219, the probabilistic signature generation process 155 associates the probability to a configurable limit. The configurable limit defines a threshold beyond which an attacked is assumed to be in progress. In an example configuration, the probabilistic signature generation process 155 weights each event to determine the probability of an attack on the computer system. The probabilistic signature generation process 155 associates the degree of attack to a configurable limit, such as a percentage of probability that an attack is occurring on the computer system.

In step 220, the probabilistic signature generation process 155 initializes the configurable limit of the probability of an attack. In an example embodiment, the probabilistic signature generation process 155 initializes the degree a probability of an attack on the computer system to zero. As the probabilistic signature generation process 155 observes events, the degree a probability of an attack on the computer system is modified.

In step 221, the probabilistic signature generation process 155 defines the configurable limit of the probability of an attack as a range of configurable limits. In an example configuration, the probabilistic signature generation process 155 defines the configurable limit of attack on the computer system as a bounded limit. In another example configuration, the probabilistic signature generation process 155 defines the configurable limit as a range of configurable limits.

Alternatively, in step 222, the probabilistic signature generation process 155 modifies the probability of an attack on the computer system based on the information provided by the security interceptor 200-N. In an example configuration, the probabilistic signature generation process 155 observes a set of events. Based on the observation of the set of events, the probabilistic signature generation process 155 modifies the degree of attack on the computer system. The probabilistic signature generation process 155 can increase or decrease the probability of an attack on the computer system based on the observation of a single event, or a set of events.

Figure 8:
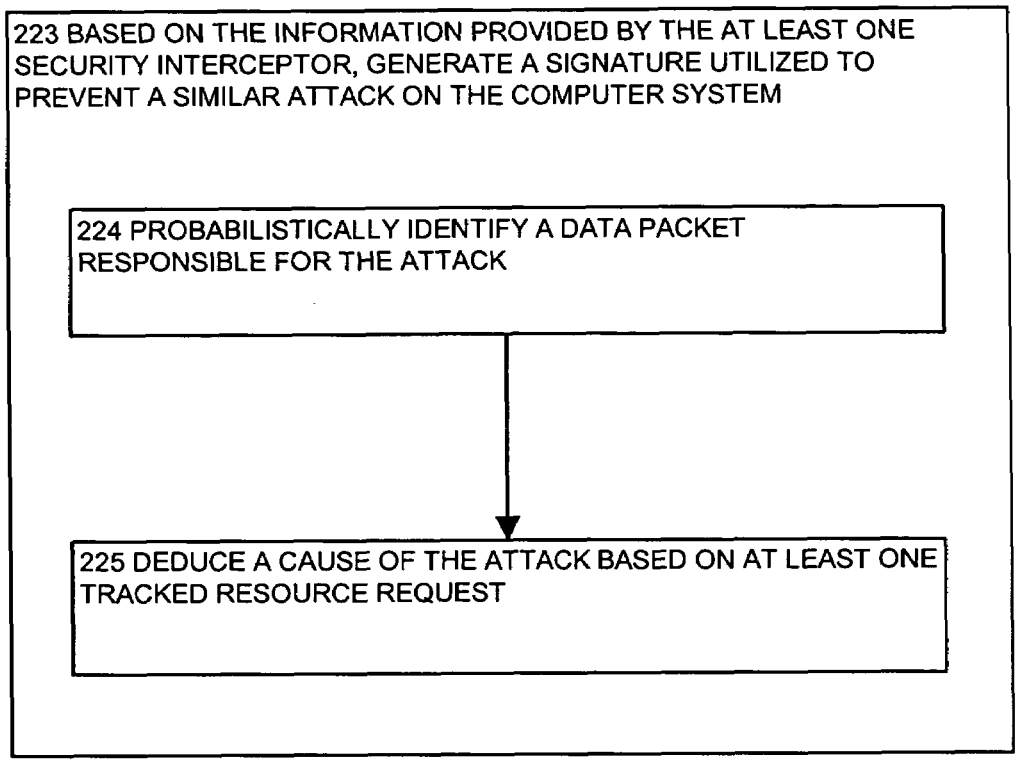
FIG. 8 illustrates a flowchart of a procedure performed by a computer system of FIG. 1 when the probabilistic signature generation process generates a signature based on the information provided by the at least one security interceptor, according to one embodiment disclosed herein.

FIG. 8 is a flowchart of the steps performed by the probabilistic signature generation process 155 when it generates a signature based on the information provided by the security interceptor 200-N.

In step 223, the probabilistic signature generation process 155 generates a signature based on the information provided by the security interceptor 200-N. The signature is utilized to prevent similar attack on the computer system. In an example embodiment, the probabilistic signature generation process 155 determines a probability that an attack is occurring on the computer system, based on information provided by the 'hooks' (i.e., security interceptors 200-N). The probabilistic signature generation process 155 attempts to generate a signature based on the received information. The signature may be generated based on a bad packet or based on a history of tracked resources.

In step 224, the probabilistic signature generation process 155 probabilistically identifies a data packet responsible for the attack. In an example configuration, the probabilistic signature generation process 155 identifies a data packet possibly responsible for the attack, and generates a signature for the data packet.

In step 225, the probabilistic signature generation process 155 deduces a cause of the attack based on at least one tracked resource request. In an example configuration, the probabilistic signature generation process 155 determines a probability that an attack on the computer system is occurring. Based on the history of tracked resources, the probabilistic signature generation process 155 identifies a potential source of the attack and generates a signature based on that assumed source.

While the system and method have been particularly shown and described with references to configurations thereof, it will be understood by those skilled in the art that various changes in form and details may be made therein without departing from the scope of the embodiments disclosed herein encompassed by the appended claims. Accordingly, the present embodiments disclosed herein are not intended to be limited by the example configurations provided above.

What is claimed is:

1. A method of providing computer security in a computer networking environment including at least one computer system, the method comprising:

receiving information from at least one security interceptor associated with at least one computer system, the information including identifying details associated with a traffic flow in a computer system of the computer networking environment;

wherein receiving information from at least one security interceptor associated with at least one computer system comprises receiving information from the at least one security interceptor indicating an occurrence, at a time the traffic flow was intercepted, of at least one of: a buffer overflow, a process exception and a system configuration file modification;

wherein the details identify at least one system event that occurred on the same computer system;

determining a probability that an attack on the computer system is in progress based on attack information associated with previous attacks;

establishing a probabilistic link between the at least one system event and the probability that an attack on the computer system is in progress;

wherein the probabilistic link is a correlation between the at least one system event and one or more system events in a plurality of system events associated with previous attacks;

wherein the probability is based at least in part on one or more weights associated with the at least one system event; and based on the information provided by the at least one security interceptor, generating a signature utilized to prevent a similar attack on the computer system.

2. The method of claim 1 further comprising:

inserting at least one security interceptor in the computer system, the at least one security interceptor providing information associated with the computer system.

3. The method of claim 1 wherein receiving information from at least one security interceptor associated with at least one computer system comprises:

receiving information from the at least one security interceptor monitoring at least one of: a system call; an instance of downloaded content; an instance of CPU utilization; at least one network connection; an instance of a new software program installation; an instance of a new service installation; a first time instance of an application invocation; an instance of mobile code execution; an instance of at least one root-kit detection; and an instance of memory utilization.

4. The method of claim 2 further comprising:

using the at least one security interceptor to filter data processing in the computer system.

5. The method of claim 2 further comprising:

controlling a behavior of at least one application on the computer system by the at least one security interceptor.

6. The method of claim 1 wherein receiving information from at least one security interceptor associated with at least one computer system comprises:

receiving notification that the at least one event has occurred on the computer system;

receiving information associated with the at least one event that occurred on the computer system;

mapping the information associated with the at least one event to at least one data entry point on the computer system; and identifying that the at least one event is specific to the at least one data entry point on the computer system.

7. The method of claim 6 wherein receiving information associated with the at least one event that occurred on the computer system comprises:

detecting the at least one event is associated with a set of events, the at least one event occurring generally at a same time as the set of events.

8. The method of claim 7 wherein detecting the at least one event is associated with a set of events comprises:

identifying the at least one event is related to the set of events, the at least one event having a link to the set of events.

9. The method of claim 7 further comprising:

identifying the at least one event is not related to the set of events despite having occurred generally at a same time as the set of events.

10. The method of claim 7 wherein detecting the at least one event is associated with a set of events comprises:

observing an order of the set of events, the order including a placement of the at least one event within the order of the set of events.

11. The method of claim 1 wherein determining a probability that an attack on the computer system is in progress based on a probabilistic link provided by the information comprises:

associating the probability to a configurable limit, the configurable limit defining a threshold beyond which an attack is assumed to be in progress.

12. The method of claim 11 wherein associating the probability to a configurable limit comprises:

initializing the configurable limit of the probability of an attack.

13. The method of claim 11 wherein associating the probability to a configurable limit comprises:

defining the configurable limit of the probability of an attack as a range of configurable limits.

14. The method of claim 1 wherein determining a probability that an attack on the computer system is in progress based on a probabilistic link provided by the information comprises:

modifying the probability of an attack on the computer system based on the information provided by the at least one security interceptor.

15. The method of claim 1 wherein based on the information provided by the at least one security interceptor, generating a signature utilized to prevent a similar attack on the computer system comprises:

probabilistically identifying a data packet responsible for the attack.

16. The method of claim 1 wherein based on the information provided by the at least one security interceptor, generating a signature utilized to prevent a similar attack on the computer system comprises:

deducing a cause of the attack based on at least one tracked resource request.

17. A computer system comprising:

a memory;

a processor;

a communications interface;

an interconnection mechanism coupling the memory, the processor and the communications interface; and wherein the memory is encoded with an application providing generating a signature that, when performed on the processor, provides a process for processing information, the process causing the computer system to perform the operations of:

providing an event correlation engine in communication with an application file interceptor; and wherein said event correlation engine receives information from at least one security interceptor associated with at least one computer system, the information identifying details associated with a traffic flow in a computer system of the computer networking environment;

wherein receiving information from at least one security interceptor associated with at least one computer system comprises receiving information from the at least one security interceptor indicating an occurrence, at a time the traffic flow was intercepted, of at least one of: a buffer overflow, a process exception and a system configuration file modification;

wherein the details identify at least one system event that occurred on the same computer system;

instructions for determining a probability that an attack on the computer system is in progress based on attack information associated with previous attacks;

instructions for establishing a probabilistic link between the at least one system event and the probability that an attack on the computer system is in progress;

wherein the probabilistic link is a correlation between the at least one system event and one or more system events in a plurality of system events associated with previous attacks;

wherein the probability is based at least in part on one or more weights associated with the at least one system event; and based on the information provided by the at least one security interceptor, instructions for generating a signature utilized to prevent a similar attack on the computer system.

18. The computer system of claim 17 wherein when the event correlation engine determines a probability that an attack on the computer system is in progress based on a probabilistic link provided by the information, the event correlation engine correlates the probability to a configure limit.

19. A non-transitory computer readable medium encoded with computer programming logic that when executed on a process in a computerized device provides computer security, the medium comprising:

instructions for receiving information from at least one security interceptor associated with at least one computer system, the information including identifying details associated with a traffic flow in a computer system of the computer networking environment;

wherein receiving information from at least one security interceptor associated with at least one computer system comprises receiving information from the at least one security interceptor indicating an occurrence, at a time the traffic flow was intercepted, of at least one of: a buffer overflow, a process exception and a system configuration file modification;

wherein the details identify at least one system event that occurred on the same computer system;

instructions for determining a probability that an attack on the computer system is in progress based on attack information associated with previous attacks;

instructions for establishing a probabilistic link between the at least one system event and the probability that an attack on the computer system is in progress;

wherein the probabilistic link is a correlation between the at least one system event and one or more system events in a plurality of system events associated with previous attacks;

wherein the probability is based at least in part on one or more weights associated with the at least one system event; and based on the information provided by the at least one security interceptor, instructions for generating a signature utilized to prevent a similar attack on the computer system.

20. A method comprising:

receiving a first event from a first security interceptor configured on at least one computer system to intercept a traffic flow in the at least one computer system;

determining whether the first event corresponds to one of a plurality of events associated with previous attacks;

in response to determining that the first event corresponds to one of a plurality of events associated with previous attacks, increasing an attack probability value based on a value associated with the first event ;

determining that the same computer system is being attacked when the attack probability value exceeds an attack threshold;

wherein determining that the first event corresponds to one of a plurality of events associated with previous attacks comprises receiving information from the first security interceptor indicating an occurrence, at a time the traffic flow was intercepted, of at least one of: a buffer overflow, a process exception, and a system configuration modification.

21. The method of claim 20 further comprising:

inserting a second security interceptor in the computer system, the second security interceptor providing information associated with the computer system.

22. The method of claim 21 wherein receiving information from the first security interceptor associated with at least one computer system further comprises:

receiving information from the first security interceptor monitoring at least one of: a system call, an instance of downloaded content, an instance of CPU utilization, at least one network connection, an instance of a new software program installation, an instance of a new service installation, a first time instance of an application invocation, an instance of mobile code execution, an instance of at least one root-kit detection, and an instance of memory utilization.

23. The non-transitory computer readable medium of claim 19 further comprising:

instructions for inserting an additional security interceptor in the computer system, the additional security interceptor providing information associated with the computer system.

24. The non-transitory computer readable medium of claim 23 wherein instructions for receiving information from at least one security interceptor associated with at least one computer system further comprise:

instructions for receiving information from the at least one security interceptor monitoring at least one of: a system call, an instance of downloaded content, an instance of CPU utilization, at least one network connection, an instance of a new software program installation, an instance of a new service installation, a first time instance of an application invocation, an instance of mobile code execution, an instance of at least one rootkit detection, and an instance of memory utilization.

\* \* \* \* \*